United States Patent [19]

Kosowsky et al.

[11] 3,795,913

[45] Mar. 5, 1974

[54] LOW ANGLE, AIR TO GROUND RANGING RADAR

[75] Inventors: Lester H. Kosowsky, Stamford, Conn.; Richard S. Pierro, New York, N.Y.

[73] Assignee: United Aircraft Corporation, East Hartford, Conn.

[22] Filed: Dec. 15, 1972

[21] Appl. No.: 315,714

[52] U.S. Cl......... 343/16 M, 343/5 DP, 343/17.2 R
[51] Int. Cl.............................................. G01s 9/22
[58] Field of Search ....... 343/5 DP, 16 M, 17.2 PC, 343/17.2 R

[56] References Cited
UNITED STATES PATENTS
3,085,243  4/1963  Bond............................ 343/16 M X

*Primary Examiner*—T. H. Tubbesing
*Attorney, Agent, or Firm*—Melvin Pearson Williams

[57] ABSTRACT

An airborne monopulse track radar employs frequency agility of the transmitted pulse to decorrelate scintillations resulting from the complex re-radiation characteristics of the many individual scatterers which terrain represents, particularly at low grazing angles. This also effectively modulates the return clutter, which normally has a high spectral density below about 100 Hz, to higher frequencies, thereby permitting usage of range gated integration. The invention eliminates the appearance of many false zero-crossings, thereby permitting accurate ranging to the ground from the airborne monopulse radar.

2 Claims, 7 Drawing Figures

LOW ANGLE, AIR TO GROUND RANGING RADAR

BACKGROUND OF THE INVENTION

1. Field of the Invention

This invention relates to airborne radar ranging systems, and more particularly to improvements in an air to ground ranging system.

2. Description of the Prior Art

As is known, the amplitude-comparison monopulse radar employs two overlapping receiver antenna lobes displaced by a small angle. In the elevation plane, upper and lower lobes are located symmetrically above and below the boresight axis of the antenna. The direction to a target illuminated by the two lobes is determined by the angle of arrival of the return wave to the antenna, which is a normal to the constant phase surface across the receiving aperture. The received signals in each lober undergo coherent RF addition and subtraction to result in a sum signal and a difference signal. Along the boresight direction, the signal returns in the upper and lower lobes are of equal amplitude so that the difference signal becomes zero. The sum and difference signals are applied to a phase-sensitive detector to produce the sum and difference video signals. For air to ground ranging, only the difference signal is of significance; this signal is of one polarity for ranges below the boresight range to ground, and of an opposite polarity for ranges in excess thereof. This is due to the fact that the lower lobe will have a higher energy content at the shorter ranges and the upper lobe will have a higher energy content at the longer ranges. However, at the range at which the boresight axis intersects with the ground, the energy content of the upper and lower lobes are equal so that the difference signal is zero. Thus, a range gate need only track the zero crossover to continuously monitor the air to ground range of the radar-carrying vehicle.

However, the ability of an amplitude monopulse radar to measure the angle of arrival of reflected energy has heretofore been achieved only with large range errors, particularly at shallow depression angles (when the aircraft is flying close to the ground or at extremely large ranges). This is due, mainly, to the fact that the target used for air to ground ranging is, of course, terrain. Terrain is a complex, distributed radar target which can be thought of as many individual scatterers with complex re-radiation characteristics. The interference between waves re-radiated by the various scatterers of the terrain target interfere with one another so as to generate complex wavefronts which are not spherical in shape, as are unaltered wavefronts resulting from single point reflectors. The lack of an essentially spherical wavefront causes the apparent angle of arrival of the received signal at the antenna to scintillate. Other effects such as wind conditions, aircraft motion and multipath interference situations further deteriorate the wavefront. Furthermore, shallower grazing angles result in increased perturbations of the radiation pattern from the terrain. To the extent that such scintillations and perturbations are in the vertical plane, the net result is to cause multiple crossover points in the elevation difference video signal. Each null (zero crossover) in the difference signal is taken as an indication of an intersection of the radar boresight with the ground. Therefore, the range gate will jump from one null to another and the slant range will continually be in error because the amplitude monopulse radar cannot discern the true crossover range from false crossovers resulting from scintillations and perturbations. In addition, these errors in range are time-varying due to the time-variant characteristics of the phase-front scintillation emanating from the variations in the illuminated cross-section of the terrain.

SUMMARY OF THE INVENTION

The principal object of the present invention is to provide an improved air to ground ranging radar.

According to the present invention, an amplitude monopulse ranging radar includes a frequency agile transmitter and range gated integration of the elevation difference video signal.

The present invention provides decorrelation of the scintillations and perturbations resulting from the many scatterers in illuminated terrain, thereby permitting averaging or filtering of the perturbations and scintillations substantially to zero by means of range gated integration. In this fashion, the invention eliminates false zero-crossings in the elevation difference video signal, thereby providing a true indication of air to ground range.

The foregoing and other objects, features and advantages of the present invention will become more apparent in the light of the following detailed description of a preferred embodiment thereof, as illustrated in the accompanying drawing.

DESCRIPTION OF THE PREFERRED EMBODIMENT

Figure 1:
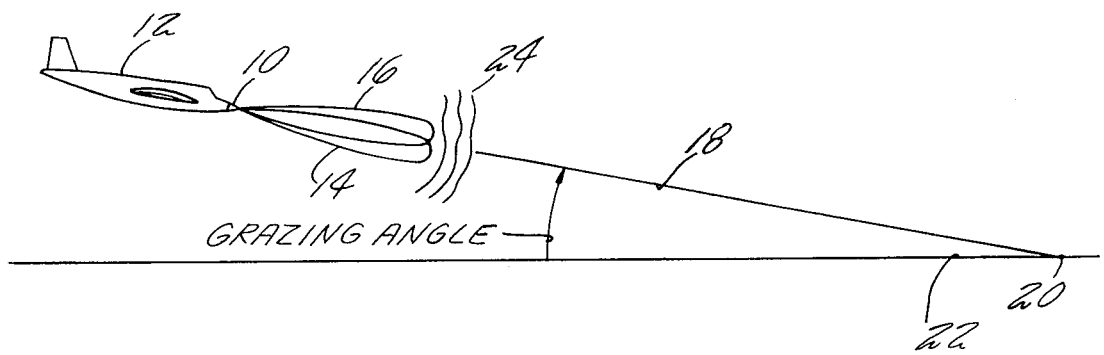
FIG. 1 is a diagrammatic illustration of an air to ground ranging situation, illustrating the problems associated with the prior art.
Figure 2:
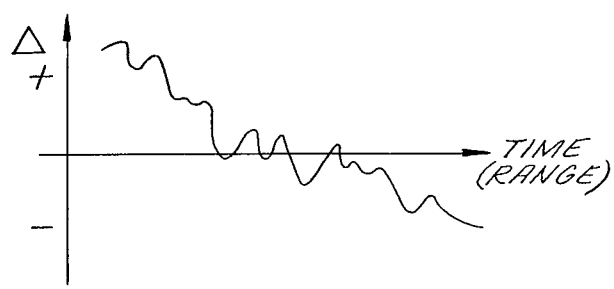
FIG. 2 is a waveform illustrating the elevation difference video signal as a function of range in an amplitude monopulse system known to the prior art.
Figure 3:
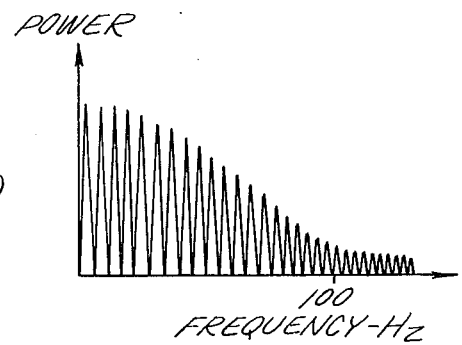
FIG. 3 is a simplified plot illustrative of the spectral density of angular scintillations in an amplitude monopulse system known to the prior art.

Referring now to FIG. 1, an amplitude monopulse radar 10 carried on an aircraft 12 has a lower beam 14 and an upper beam 16 which are at slight angles with respect to each other, vertically symmetrical about the radar antenna boresight axis 18. As is described briefly hereinbefore, to determine the range along the boresight 18 to the point 20 where it intersects with the ground plane 22 is achieved simply by determining the range at which the energy content of the two beams is equal so that the difference therein is zero. However, FIG. 2 illustrates that the plot of the amplitude difference (Δ) of the energy in the upper beam 16 from that of the lower beam 14 as a function of time (and therefore is a function of range), which is typical of a conventional amplitude monopulse radar operating against terrain at a low grazing angle, includes several points where the difference (Δ) changes from positive to negative or from negative to positive. Each of these falsely indicate to the radar system the range at which the boresight axis supposedly intersects with the ground. This is due, as described hereinbefore, to non-spherical wavefronts 24 (FIG. 1) which result from re-radiation from a wide variety of scatterers which make up the terrain in the cross section of the ground plane which is illuminated by the radar. Thus for any one transmitted pulse, a return signal from a given range (and therefore a given depression or grazing angle which is not the true depression angle of the boresight axis 18) may, by providing a non-spherical wavefront to the antenna of the radar 10, affect the antenna in the same fashion as a spherical wavefront which is returned from the point 20 along the boresight axis 18. It thus supplies equal energy to each of the lobes, thereby causing the difference to fall to zero. Although these scintillations or perturbations (that is, the non-spherical characteristics of the return wave) vary widely with time, that is, on a pulse to pulse basis, they nonetheless are correlated with one another due to the fact that the generation thereof is as a result of the aircraft flying along a path which causes successive elements of the terrain to be illuminated in turn. The correlation is such that the spectral density of the angular variations or perturbations is extremely large at low frequencies (such as frequencies typically below 100 Hz) as illustrated in FIG. 3. Thus, although these could be averaged out by suitable filtering, the filtering would have to be at such a low frequency (0 to roughly 100 Hz) as to substantially eliminate the ability of the radar to sense valid variations in range which may occur.

Figure 4:
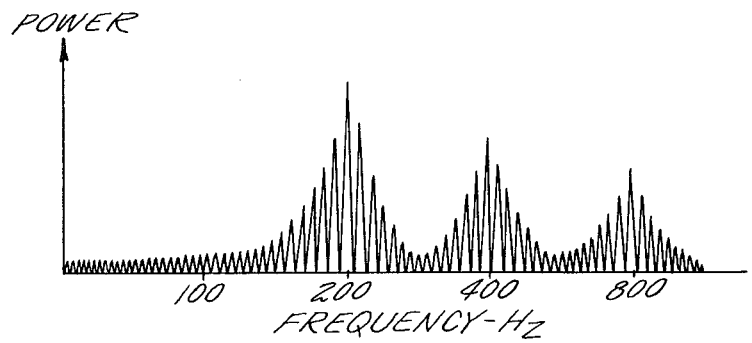
FIG. 4 is a simplified plot of spectral density of angular variations in an amplitude monopulse radar employing frequency agility in accordance with the present invention.
Figure 5:
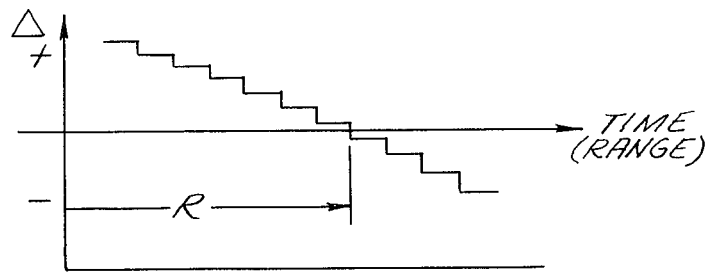
FIG. 5 is a waveform illustrating elevation difference video as a function of range in an amplitude monopulse radar employing frequency agility and range gated integration in accordance with the present invention.

According to a first aspect of the present invention, the frequency of the radar transmitter carrier is modulated (frequency agility) in order to decorrelate the scintillations, and, in the sense, to modulate them to a higher frequency. It is known in the art that a frequency agile radar transmitter will provide scintillations at the frequency of sweeping the carrier frequency of the transmitter, and at harmonics thereof, as is illustrated in FIG. 4. Thus, if the transmitter frequency were swept between its lowest and highest frequencies at a 200 Hz rate, the spectral density would be greatest at 200 Hz, but would also be high at 400 Hz and just somewhat less at 800 Hz, and so forth. In accordance with the invention, use of frequency agility permits utilization of a low pass filter (one at which its upper 3 db breakpoint is on the order of 100 Hz or less) to completely filter out the scintillations since all of these are at higher frequencies. By removing the effects of the angular scintillations, which is done in accordance with the present invention by means of range-gated integration, the present invention provides a difference video signal which is staircase-like in waveform (each step representing a range bin) which crosses zero only at the true range to ground, as is illustrated in FIG. 5. This occurs at a time corresponding to the true range R to the ground along the boresight.

Figure 6:
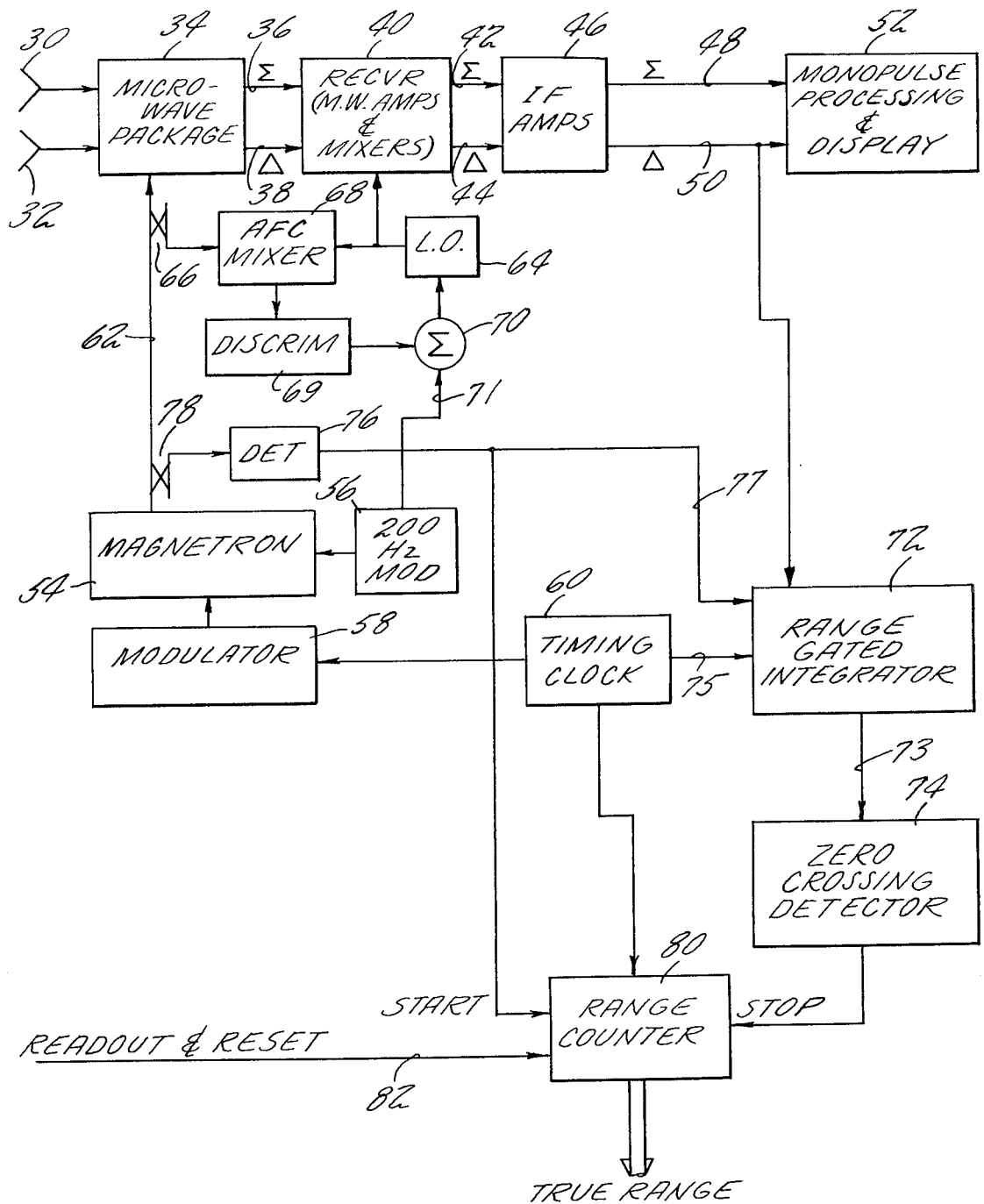
FIG. 6 is a simplified schematic block diagram of an illustrative embodiment of a frequency agile amplitude monopulse radar system employing range gated integration in accordance with the present invention.

Referring now to FIG. 6, an exemplary embodiment of an improved amplitude monopulse radar, employing frequency agility and range gated integration in the difference channel, receives return signals at a pair of antennas 30, 32 and the signals are applied to a microwave package 34. The microwave package 34 is illustrative of well known microwave apparatus which performs necessary functions in a conventional amplitude monopulse radar in order to permit transmitting and receiving of energy. The package may include apparatus for performing the T/R function, circulators, and, if desired as illustrated in FIG. 6, couplers, quad hybrids, and other devices so as to form the sum and difference of the received energy at the microwave frequencies. As illustrated, the package 34 may also provide for transmission of the main radar energy in one or both of the antennas 30, 32; however, it should be understood that the transmitter energy may be transmitted by a different antenna if desired, all as is well known in the conventional amplitude monopulse radar art. In addition, the present embodiment may be part of a larger system which includes a pair of antennas for supplying beams in an azimuthal plane. Similarly, instead of separate antennas, separate horns feeding a single antenna may be utilized, all as is well known in the art.

The output of the microwave package 34 comprises microwave signals in a sum channel 36 and in an elevation difference channel 38 connected to a conventional receiver 40 which includes microwave amplifiers and mixers for each channel so as to provide sum and difference IF signals on respective channels 42, 44 for application to IF amplifiers 46, the output of which comprises sum and difference video signals on respective channels 48, 50; these signals may be applied to conventional monopulse processing and display apparatus 52 if desired. The significant thing is the provision of the difference video signal on the line 50 which is utilized to determine the slant range to ground along the boresight of the radar.

The transmitter section may be of any known frequency-agile type in which the carrier frequency can be slewed between upper and lower frequency limits. For instance, the transmitter may transmit a carrier wave at frequencies centered about 16 GHz with a 35 MHz tuning range, which may be tuned at a 200 Hz rate. To achieve this, a magnetron 54 is tunable by mechanically adjusting the size of its frequency-determining cavity, such as by utilizing a 200 Hz motor drive, referred to herein in block form as a 200 Hz modulator 56, to operate a plunger in the cavity at a 200 Hz cyclic rate. Frequency tuning ranges on the order of 35 MHz are readily achieved with a fraction of an inch of adjustment of the cavity. Such tunable magnetrons are well known and readily available in the art. The magnetron is excited by a modulator 58 in response to a timing clock 60, which provides signals defining the pulse repetition rate (which may be on the order of several KHz), the pulsewidth, and other factors all in a well known fashion. The output of the magnetron is applied over a suitable microwave channel 62 to the microwave package 34 so as to provide for transmission through either or both of the antennas 30, 32. However, transmission by a separate antenna (which is a common practice) may be utilized if desired.

In order to provide proper control of a local oscillator 64, which supplies the beat frequency for use in the receiver mixers in order to generate IF frequencies in a well known fashion, a portion of the transmitter energy is extracted by a microwave coupler 66 and applied to an AFC mixer 68 along with the output of the local oscillator 64. The output of the AFC mixer 68 is applied to an automatic frequency control discriminator circuit 69, the output of which is applied to a summing circuit 70, which in turn provides an output voltage to control the frequency of the local oscillator 64. The summing network 70 also receives a signal on a line 71 which is derived either from the 200 Hz modulator 56 (as shown in the embodiment of FIG. 6) or which may be derived from the movable portion of the magnetron, such as a cavity plunger, by means of a potentiometer or other pick off or transducer, as is known in the art. The frequency agility lead signal on the line 71 provides a coarse input to the local oscillator 64 so that the local oscillator 64 will closely follow the magnetron 54. On the other hand, the RF picked off by the coupler 66 and applied to the AFC mixer 68 tends to fine tune the local oscillator 64 in a very precise fashion (as is true with all local oscillator AFC circuits). This causes the local oscillator, which is tunable, to slew in a 35 MHz tuning range, and in a manner to follow that of the transmitter so that a constant IF frequency can be maintained. A frequency agile AFC which may be utilized in the embodiment of FIG. 6 is illustrated in U.S. Pat. No. 3,413,634, issued to Manuel Selvin on November 26, 1968 and entitled "AUTOMATIC FREQUENCY CONTROL FOR FREQUENCY AGILITY RADAR SYSTEM."

The difference signal on the line 50 is applied to a range gated integrator 72, the output of which is coupled by a lead 73 to a zero-crossing detector 74 which detects when the elevation difference signal passes from one polarity to another, as described hereinbefore. One input to the range gated integrator 72 is from the timing clock 60 which provides signals on a line 75 at a frequency which relates to the desired range resolution (one signal for each range gate, which relates to each of the steps in the difference signal as illustrated in FIG. 5). Another signal is applied to the range gated integrator 72 over a line 77 from a detector 76 which receives a small portion of the transmitter energy from a coupler 78 and provides a signal indicating the timing of the transmitted pulse (or main bang, as it is sometimes referred to). This synchronizes the range gated integrator so that the switching of the range gated low pass filters corresponds to the reception of signals from targets at successive designated ranges relating to each range gate. The range gated integrator 72 is described more fully with respect to FIG. 7 hereinafter.

The timing clock 60 also provides advancing signals to a range counter 80 which starts counting upon the occurrence of the transmitted pulse in response to a signal from the detector 76, and stops counting in response to the zero crossing detector 74 applying a signal thereto indicating that the difference signal has crossed through zero. The count set in the range counter 80, at a point in time after each transmitted pulse which corresponds with more than the maximum range of the radar, is the true range to ground along the boresight. This may be made available for processing in any well known fashion, such as by utilizing a read out and reset signal on a line 82 in any conventional way.

Thus the apparatus of FIG. 6 simply comprises a conventional amplitude monopulse radar system except that it is provided with transmitter frequency agility and has a range gated integrator 72 interposed between the difference IF channel and the zero crossing detector.

Figure 7:
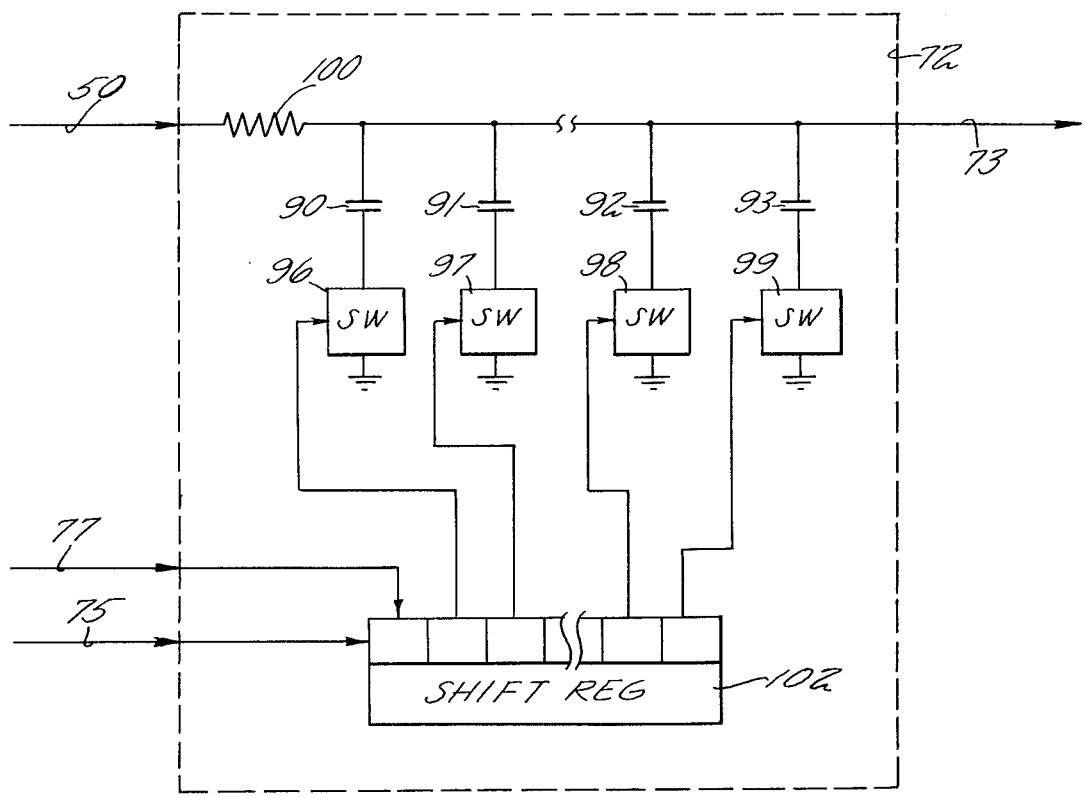
FIG. 7 is a simplified illustration of a well known range gated integrator which may be employed in the embodiment of FIG. 6.

Referring now to FIG. 7, the range gated integrator 72 comprises a plurality of capacitors 90-93 each connected from the signal line 73 to ground through a related switch 96-99. A common resistor 100 provides, with each of the capacitors in turn, a low pass filter which averages the signal received at a time corresponding to a given range for one transmitted pulse with those of previous and later transmitted pulses which are received at a related range time. Each of the capacitors 90-93 is connected to ground in turn by the related switches 96-99 in response to timing signals applied thereto, all as is well known in the art. For instance, the timing signals may come from respective stages of a shift register 102 which has the pulse on the line 77 (derived from the transmitted pulse) inserted into the lowest order thereof, and clocking signals on the line 75 advancing this bit through successive stages of the shift register at a rate which corresponds with the range resolution. Each time that a given capacitor is connected by operation of the related switch, it will have maintained charge since the last time the switch was connected, and the potential in the capacitor will change in the direction of the signal on the line 73 during the time that the switch is closed, in a well known fashion. It is to be understood that range gated integrators are well known, and any suitable one may be utilized in the implementation of the present invention.

Thus there has been described a frequency agile amplitude monopulse ground ranging radar system which employs a conventional frequency agile transmitter section and a conventional range gated integrator in order to permit filtering out of decorrelated scintillations of indicated angle, so as to provide but a single zero crossing of the conventional monopulse difference signal, thereby to provide an accurate measure of the slant range along the boresight to ground.

Although the invention has been shown and described with respect to a preferred embodiment thereof, it should be understood by those skilled in the art that the foregoing and various other changes and omissions in the form and detail thereof may be made therein without departing from the spirit and the scope of the invention.

Having thus described a typical embodiment of our invention, that which we claim as new and desire to secure by Letters Patent is:

1. In an amplitude monopulse radar system for providing an indication of slant range to ground along the antenna boresight of the radar system, said system including a zero crossing detector to detect the change in elevation difference video signal from one polarity to another working in conjunction with means to determine the range at which zero crossings of the difference video signal occur, the improvement comprising:
   a frequency agile transmitter; and
   a range gated integrator interposed in the difference video signal line, the output of the range gated integrator feeding the zero crossing detector, whereby the difference video is averaged discretely in each of a plurality of range resolution bins, thereby removing from the difference video signal scintillations therein resulting from clutter in the illuminated terrain, so as to provide a staircase-like difference video signal with but a single crossing from one polarity to the other.

2. An amplitude monopulse ground ranging radar system comprising:
- a frequency agile transmitter;
- antenna means for transmitting microwave energy and including at least two receiving antennas spaced apart in a vertical plane symmetrically above and below the antenna boresight;
- receiver means responsive to microwave energy received at said antenna means and providing a difference video signal, the magnitude of which is a function of the difference in the energy level of return signals received at each of the two antennas;
- a range gated integrator operative to provide low pass filtering of the difference video signal in discrete range resolution cells;
- a zero crossing detector responsive to the output of the range gated integrator; and
- a range counter responsive to the output of the zero crossing detector and responsive to each transmitter pulse to start a count and to stop counting upon the issuance of a signal by said zero crossing detector indicating that the difference video signal has crossed zero from one polarity to another polarity, the output of said range counter indicating the true range along the boresight to ground.

* * * * *